Figure 1:
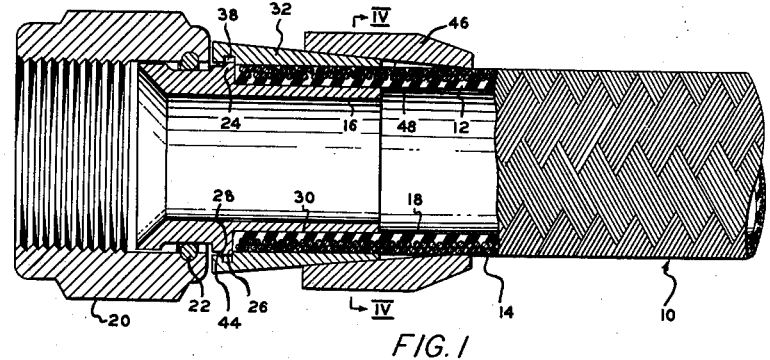

June 29, 1965 R. R. LA MARRE ETAL 3,191,975
HOSE FITTING
Filed April 20, 1960 2 Sheets-Sheet 1

INVENTORS
ROGER R. LA MARRE
HANS H. VAN DER VELDEN
BY
ATTORNEY

June 29, 1965 R. R. LA MARRE ETAL 3,191,975
HOSE FITTING
Filed April 20, 1960 2 Sheets-Sheet 2
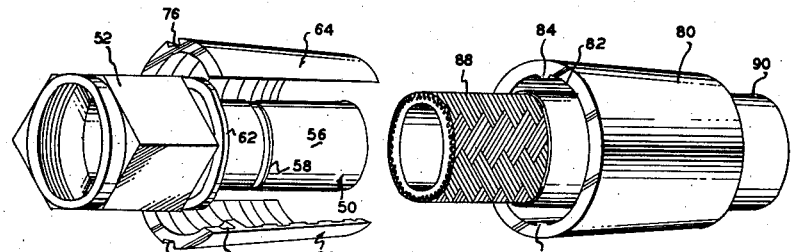
FIG. 6
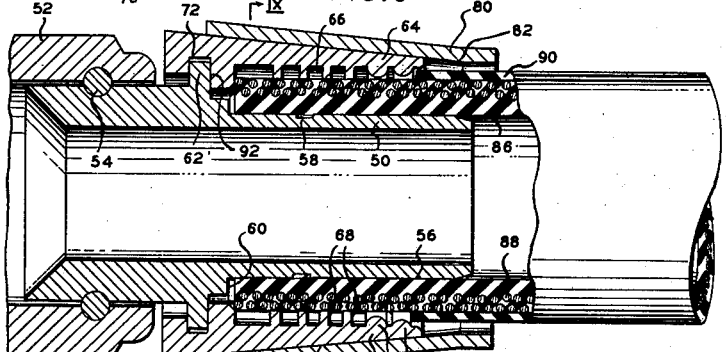
FIG. 7
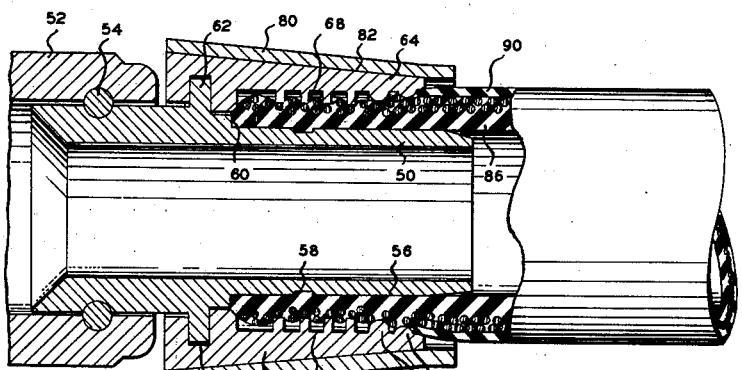
FIG. 8
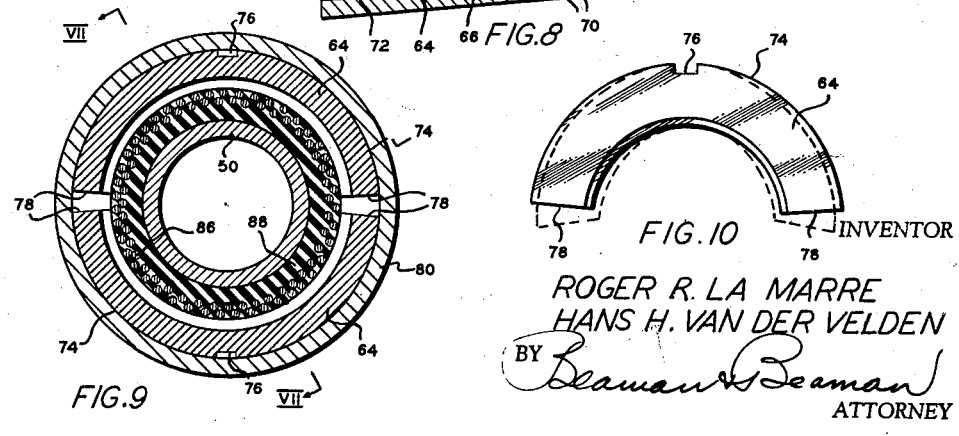
FIG. 9
FIG. 10
INVENTOR
ROGER R. LA MARRE
HANS H. VAN DER VELDEN
BY
ATTORNEY United States Patent Office 3,191,975
Patented June 29, 1965

1

3,191,975
HOSE FITTING
Roger R. La Marre and Hans H. van der Velden, Jackson, Mich., assignors to Aeroquip Corporation, Jackson, Mich., a corporation of Michigan
Filed Apr. 20, 1960, Ser. No. 23,564
1 Claim. (Cl. 285—243)

The invention relates to a conduit end fitting and particularly pertains to a fitting of reuseable type.

A conventional construction of reuseable end fittings for a hose conduit, or for particular types of metal conduits, consists of a tubular nipple which is insertable into the bore of the conduit and a socket member which encompasses the exterior surface of the hose in the nipple region and compresses the hose upon the nipple whereby the hose material is maintained in intimate engagement with both the nipple and the socket. Many fittings of this type employ threaded members to affix the socket to the hose, the nipple to the hose, or the socket to the nipple and it is common practice to form the threads of one of the members, or both, in a tapered fashion whereby the tapered configuration of the threads will compress the hose material upon the placing of the fitting member thereon. The use and manufacture of such threaded components is relatively expensive in that the machining of the threads is an exacting operation, even in a high production item such as a hose fitting. Furthermore, the use of threads with hose or other types of conduits of the sizes above .250" I.D. makes it relatively difficult to assemble the fitting to the hose with conventional tools and special fixtures and tools are often required for the assembly operation.

It is an object of the present invention to provide a reuseable conduit end fitting wherein threads are not required in the assembly of the fitting whereby the cost of manufacture of the fitting is substantially reduced and fittings of all sizes may be easily assembled to the conduit without special equipment.

Another object of the invention is to provide a conduit end fitting where the compression of the conduit is in a radial direction only and is produced by a relative nonrotating axial displacement of the fitting parts wherein wedge surfaces produce the assembly of the fitting upon the conduit.

Yet another object of the invention is to provide an end fitting wherein an annular sleeve circumscribes the conduit in the region of the nipple and a wedge socket element radially deforms the sleeve upon the hose to provide an intimate engagement between the conduit, nipple and the sleeve.

A further object of the invention is to provide a conduit end fitting employing an internal nipple and an external sleeve engaging the conduit wherein the nipple and sleeve are mechanically interlocked to prevent relative axial displacement therebetween.

Figure 2:
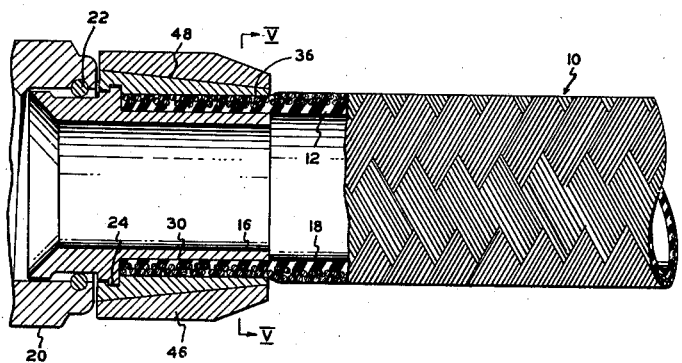

These and other objects of the invention will be apparent from the described embodiments and the accompanying drawings wherein:

FIG. 1 is an elevational, partly in section, view of a hose and end fitting in accordance with the invention in partially assembled relation wherein the socket has not begun to deform the sleeve, FIG. 2 is an elevational, partly in section, view of the fully assembled hose and end fitting of FIG. 1 wherein the sleeve has been contracted and deformed,

2

Figure 3:
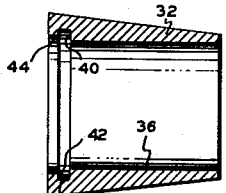
Figure 4:
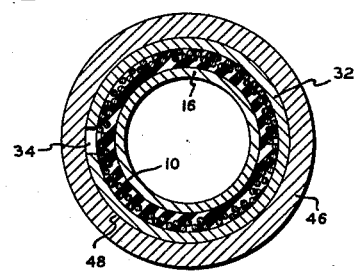
Figure 5:
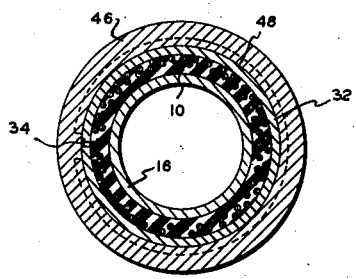

FIG. 3 is an elevational sectional view of the sleeve element employed in the embodiment of FIG. 1, FIG. 4 is an elevational sectional view of the embodiment of FIG. 1 taken along section IV—IV, FIG. 5 is an elevational sectional view of the invention as shown in FIG. 2 as taken along section V—V, FIG. 6 is a perspective exploded view of another embodiment of the invention with the parts located prior to assembly, FIG. 7 is an elevational, partly in section, view of the socket member in partially assembled relation to the sleeve segments of the embodiment of FIG. 6, FIG. 8 is an elevational, partly sectioned, view of the hose and fitting of FIG. 7 with the socket end sleeve segments in fully assembled relation, FIG. 9 is an elevational sectional view of the embodiment of FIG. 7 as taken along section IX—IX and FIG. 10 is an end view of one of the sleeve segments of the embodiment of FIG. 6 as taken from the right showing the deformed configuration in dotted lines.

Referring to the embodiment of FIGS. 1 through 5, it will be observed that the conduit 10 may be in the form of a flexible hose having an inner tube 12 of rubber or a synthetic material such as polymerized tetrafluoroethylene manufactured by the E. I. du Pont de Nemours and Company under the trademark "Teflon." The inner tube is reinforced by an outer covering consisting of braided wire layers 14 which confine the inner tube against radial expansion. It is to be understood that the illustrated hose is for illustrative purposes only and that the invention may be employed with most types of flexible hose constructions either or metallic or nonmetallic construction.

The end fitting consists of a tubular nipple 16, which is inserted into the bore 18 of the hose, and on which is rotatably mounted a nut 20 by means of an annular key 22 which permits the nut to be rotated relative to the nipple to threadably affix the nipple to conventional plumbing fittings in the known manner. Exteriorly, the nipple 16 is provided with an annular rib 24 which extends radially therefrom and defines lateral shoulders 26 and 28 on the nipple. The nipple is formed with a cylindrical surface at 30 to a diameter substantially equal to the diameter of the hose bore 18 whereby the nipple may be inserted into the hose bore until the end of the hose engages the shoulder 26 defined by the rib 24.

An annular sleeve 32, having an axial cross-section as shown in FIG. 3, annularly circumscribes the exterior of the hose in the region of the nipple and the sleeve 32 is longitudinally slotted as at 34, FIGS. 4 and 5, whereby the sleeve is not of a continuous peripheral configuration. The sleeve 32 is formed by machining a sleeve having an uninterrupted periphery such that all of the axial extending surfaces of the sleeve are concentric and of a circular configuration when viewed in a diametrical section. Thereafter the sleeve is slotted whereby the undeformed configuration of the sleeve will be truly circular in diametrical section. The inner bore 36 of the sleeve is of cylindrical configuration and extends throughout most of the length of the sleeve. An annular recess 38 is defined within the sleeve, as shown in FIG. 3, forming shoulders 40 and 42 and the sleeve is machined whereby the shoulder 42 is of such minimum dimension as to permit the sleeve portion 44 to clear the rib 24 when assembling the sleeve on the nipple. The outer surface of the sleeve 32 is formed as a cone having an angle of a small value such as 3 or 4 degrees. The conical sleeve surface extends throughout the length of the sleeve and in the undeformed state is truly circular in diametrical section, FIG. 4.

The end fitting of the invention also includes a socket member 46 of annular configuration having an axial length equal to that of the sleeve 32. The socket member is provided with a conical inner bore 48 of an angle equal to that of the conical surface of the sleeve. The socket 46 may be formed from a machined part or a stamping and is preferably of a high strength material such as steel.

To assembly the fitting to a flexible hose conduit the socket 46 is first slipped over the end of the hose with the maximum bore diameter nearest the hose end. The sleeve 32 is then inserted over the hose such that the outer conical surface converges away from the end of the hose. The inner diameter of the sleeve is only slightly greater than that of the outer diameter of the hose and, thus, a relatively close connection between the sleeve and the hose is produced. After the socket and sleeve have been inserted on the hose the nipple 16 is inserted into the hose bore 18 until the end of the hose engages the shoulder 26. At this time, the sleeve 32 is moved to the left until the sleeve portion 44 clears the nipple rib 24 and the rib is in opposed relation to the sleeve recess 38 as shown in FIG. 1. At this time the rib shoulder 26 will be engaging the recess shoulder 40. The socket 46 is then moved axially to the left to engage the conical surface of the sleeve and as the minimum diameter of the sleeve is less than the maximum diameter of the socket the socket will overlap the sleeve until the conical surfaces thereof engage as shown in FIG. 1. At this time no deformation of the sleeve has taken place. To complete the assembly the socket 46 is forceably axially moved to the left such that the conical bore 48 thereof acting upon the conical surface of the sleeve, radially forces the entire sleeve circumference inwardly to intimately grip the hose in the nipple region. The movement of the socket is continued until the socket is fully positioned on the sleeve as shown in FIG. 2 and it will be appreciated that in this fully assembled relationship the resulting radial deformation of the sleeve has caused the recess 38 thereof to receive the annular rib 24 of the nipple such that the shoulders 40 and 42 are adjacent the shoulders 26 and 28 of the rib, respectively, and, thus, provide an interlock between the sleeve and nipple which prevents relative axial displacement therebetween.

As the sleeve 32 is deforming under the influence of the socket during the socket movement the slot 34 of the sleeve will be closing, due to the sleeve deformation, and upon the final assembly the slot will be practically fully closed, as shown in FIG. 5.

As the inner conical surface 48 of the socket is circular in diametrical section the configuration of the sleeve 32 will likewise be circular in diametrical section during all stages of the deformation and the final assembly and, thus, a uniform pressure is maintained upon the hose which is necessary to insure proper sealing characteristics. The interlocking connection produced between the sleeve and nipple insures that the resistance to "blowoff" of the fitting is of a maximum value as both the inner and outer surfaces of the hose are employed in resisting the axial movement of the fitting. As the conical angle of the outer sleeve surface and the inner socket surface is at a locking angle the fitting of the invention will not accidentally disassemble under vibration or normally encountered conditions and upon connecting the fitting to conventional plumbing fixtures by means of the nut the fitting may be employed in the usual manner.

To remove the fitting from the hose conduit the assembly operation is reversed in sequence. The socket 46 is moved to the right with respect to the sleeve 32 until the socket completely clears the sleeve member. The operator, by merely inserting a screwdriver or similar tool into the slot 34 of the sleeve may open the sleeve to the point where the portion 44 thereof clears the nipple rib 24 and, hence, permit the sleeve to be moved to the right upon the hose. At this time, the nipple may be removed from the hose and the sleeve and socket likewise removed from the hose end. The fitting may thus be reused as desired and may be again assembled to a conduit as described above. The movement of the socket, both in the assembling and disassembling direction, may be easily produced by conventional tools, such as a hammer, and, thus, does not require special equipment and fixtures to facilitate the assembly of the fitting to a conduit and by the elimination of threads and other expensive machining processes, the manufacture of the disclosed fitting is substantially less than that of known configurations.

The embodiment of FIGS. 1 through 5 is particularly adapted for use with the smaller sizes of conduits and in adapting the principles of the invention to the larger hose sizes, the embodiment of FIGS. 5 through 10 is preferred. In this embodiment the sleeve is constructed of at least two segments whereby the deformation of the sleeve will be substantially uniform throughout its circumference and insures that the fitting will be concentrically and uniformly assembled to the hose.

Referring to FIGS. 6 through 8 this fitting embodiment consists of a nipple 50 having a bore therein and a nut 52 is rotatably mounted upon the nipple by means of a key 54 as in the embodiment of FIG. 1. The nipple 50 is provided with a cylindrical surface 56 of a diameter substantially equal to the inner diameter of the conduit and an annular groove 58 may be defined thereon to promote sealing and may also be used for gaging purposes as will be later described. A radial shoulder 60 is defined upon the nipple adjacent the surface 56 which is engageable by the end of the hose and an annular rib 62 is also defined upon the nipple extending in a radial direction to cooperate with a recess defined in the sleeve segments to interlock the sleeve segments and nipple against axial displacement therebetween.

In the described embodiment the sleeve is shown to consist of two segments 64, each segment being approximately 180° in circumference, see FIG. 10. With very large size hose the number of segments employed is preferably increased, for instance, three segmnets of approximately 120° or four segments of approximately 90° may also be used. The segments have a cross-sectional axial configuration as shown in FIGS. 6 and 7 consisting of an inner cylindrical surface 66 having a plurality of rectangular section ribs 68 and a pair of arcuate section ribs 70 formed thereon. The ribs 68 and 70 are for the purpose of increasing the grip of the sleeve segments upon the hose and the use of such ribs and their configuration may vary according to the type of conduit being employed and the gripping characteristics desired. It will be appreciated that it is also common to form annular serrations or ribs upon the nipple portion engaging the inner hose diameter and it is intended to be within the scope of the invention to employ such serrations upon the nipples of the disclosed embodiments.

The sleeve segments are each provided with a recess 72 adapted to cooperate with the nipple rib 62 in the above described manner. The outer surface of the sleeve segments is in the form of a conical surface 74 when the segments are in the undeformed as well as deformed state and each of the sleeve segments 64 is also provided on the outer surface with a slot 76, see FIGS. 6, 9 and 10 which reduces the wall thickness of the segments in the longitudinal direction and serves to aid in the deformation of the sleeve segments and may also be employed to align the segments within the socket as will be later described. The slots 76 extend the length of the sleeve segments and are located centrally with respect to the longitudinal edges 78 therefor.

A socket 80 of annular configuration having an internal conical bore 82 is employed to encompass the sleeve segments and deform the same upon the hose. The internal conical surface 82 is of an angle equal to that of the conical surface of the segments, in the undeformed state, and a pair of keys 84 may be defined in diametrically opposed relation upon the conical surface of the socket adjacent to the leftmost end thereof, FIG. 6. The purpose of the keys 84 is to associate with the slots 76 of the sleeve segments 64 to insure that the sleeve segments are initially positioned in diametrically opposed relation. The use of the keys 84 is not mandatory to practice the invention and are an optional feature of the socket.

In assembling the fittings of FIGS. 6 through 10 upon a hose having an inner rubber tube 86 reinforced by a wire braid layer 88 which is covered by a rubber outer cover 90, the outer rubber hose cover 80 is stripped back whereby the wire braid will be exposed to obtain maximum gripping characteristics. The groove 58, formed on the nipple, is located on the nipple such that the leftmost edge of the groove, FIG. 7, is a distance from the right end of the nipple which is equal to the length of the desired exposed area of the wire hose braid 88. Thus, by using the groove 58 as a gauge, the operator will know the desired location to sever and remove the outer hose cover. The socket 80 is then inserted over the end of the hose such that the bore 82 converges away from the end and the nipple 50 is inserted into the hose bore until the hose end engages the nipple shoulder 60. At this time, the sleeve segments 64 may be located upon the hose and nipple rib 62 as in FIG. 7. It will be noted that the segment recess 72 is received within the rib 62 and that the rightmost rib formed upon the inner surface of the segments is adjacent the severed end of the outer hose cover 90. The socket 80 is then moved to the right to engage the sleeve segments 64. Care should be taken that the sleeve segments 64 are located in opposed diametrical relationship to each other and this relationship will be insured if the socket is provided with keys 84 which are to be aligned with the slots 76 formed in the segments. The socket may be further moved to the left after engagement with the segments by use of a hammer or other conventional tool until the sleeve and socket are related as shown in FIG. 8. Due to the dimensional relationships between the inner socket conical surface 82 and the dimensions of the sleeve segments, the sleeve segments will be deformed radially inward during the movement of the socket thereupon and as shown in FIG. 10, the sleeve segments will be deformed from a maximum dimension as shown in the full lines to a minimum dimension as shown in the dotted lines. In FIG. 10 the degree of sleeve segment deformation has been exaggerated for purpose of illustration. This radial sleeve contraction produced by the socket causes the sleeve segments to intimately engage the wire braid of the hose and force the hose into intimate sealing engagement with the nipple as well. Thus, the fitting is securely affixed to the hose end. Referring to FIG. 8 it will be appreciated that the nipple rib 62 is fully received within the segment recess 72 and that axial movement between the segments and nipple is prohibited. It will be noted that the shoulder 92 of the segments defined by recess 72 is in substantial engagement with the nipple rib 62 even before the segment contraction takes place, this relationship is also present in the embodiment of FIGS. 1 through 5. This relationship is significant in that during the forcing of the socket over the sleeve or sleeve segments the nut is usually placed on a support surface and as the socket is driven toward the nut the sleeve will be held in an axially stationary position.

To remove the fitting from the hose, the socket 80 is moved to the right by tapping with a hammer or similar operation whereby the segments 64 may be radially removed from engagement with the hose and nipple rib. The nipple may then be withdrawn from the hose bore. As the deformation of the sleeve segments is limited the natural resiliency of the segments will tend to open the segments back to the undeformed shape, however, if the segments have taken a permanent set, they may be reopened to the extent necessary to permit them to be used again by placing the segments upon a flat surface such that the edges 78 rest upon the surface and the segment is tapped with a hammer in the region of slot 76 to spread the segment open sufficiently to permit the socket to be started over the segments upon reuse.

It should be appreciated that the contraction of the sleeve or sleeve segments is of a limited nature, for instance, with a hose having a .250 inch I.D. the diametrical sleeve or sleeve element deformation is in the neighborhood of .080 inch and with a hose having a 2 inch I.D. the diametrical sleeve segment deformation is approximately .150 inch. It will be understood that although the deformation is of a limited nature it is sufficient to obtain the desired hose compression and facilitate a secure connection between the fitting and the hose.

The invention discloses a conduit end fitting wherein a simplified construction is employed and which permits the fitting to be assembled to conduits by the use of conventional tools. In using the embodiment of FIGS. 6 through 10 a fitting of this type may be used with large diameter hose and yet be assembled by one man using merely a hammer and a knife. It will be appreciated that the preparation of the hose will vary depending upon the types of hose being used and the types of ribs or serrations employed upon the segments and ribs, if any. As the sleeve or sleeve segments are deformed from an original circular diametrical section of one diameter to a circular diametrical section of a lesser diameter upon the complete assembly of the fitting, the pressures exerted upon the hose will be circumferentially uniform and the sealing characteristics of the fitting will be efficiently distributed. Also, as the relative movement of the sleeve or sleeve segments is purely radial, damage to the hose or the twisting thereof is minimized.

It is appreciated that other modifications and embodiments of the invention may be apparent to those skilled in the art without departing from the spirit and scope of the invention and it is intended that the invention be defined only by the following claims.

We claim:

In combination with a tubular reinforced hose, a reusable end fitting comprising a tubular nipple extending into the bore of one end of the hose, a plurality of deformable sleeve members arranged on opposite sides of said end of said hose engaging the outer surface thereof, each of said sleeve members having an inner surface of substantially cylindrical configuration and a conical outer surface, radially, inwardly extending ribs defined on said sleeve members inner surface adapted to engage the hose, a longitudinal groove defined in each of said sleeve members in the outer conical surface thereof extending the axial length of the sleeve members and located substantially at the midpoint of the arc subscribed by each sleeve member, an annular rib concentrically defined on said nipple radially extending outwardly and defining transversely disposed abutment shoulders on opposite sides thereof, a recess defined in each of said sleeve members adapted to receive said annular rib and defined by transverse radial surfaces adapted to engage said abutment shoulders to prevent relative axial movement in either axial direction between said sleeve members and nipple and permitting radial movement of said sleeve members relative to said nipple, and a tubular socket encompassing said sleeve members and hose and forcing and maintaining said sleeve members in intimate engagement with said hose, said socket having a conical inner bore of an angle substantially equal to that of said conical surface of said sleeve members, said conical socket bore having a minimum diameter less than the minimum undeformed diameter of said sleeve members and a maximum diameter greater than the minimum undeformed diameter of said sleeve members whereupon axially forcing said socket over said sleeve members radially deforms said sleeve members about the midpoint of the arc thereof, thereby causing said sleeve members to intimately grip the hose outer surface, the inner surface of said socket having a plurality of integral radially inwardly extending key members positioned within the longitudinal slots of said sleeve members to thereby position said sleeve members relative to said socket and said nipple.

References Cited by the Examiner

UNITED STATES PATENTS

| | | | |
|---|---|---|---|
| 1,098,294 | 5/14 | Patty | 285—249 |
| 1,113,770 | 10/14 | Gabrohn | 285—249 |
| 1,448,615 | 3/23 | Deibert | 285—243 |
| 1,726,808 | 9/29 | Cox | 285—323 |
| 2,328,013 | 8/43 | Hattan | 285—243 |
| 2,552,077 | 5/51 | Williams | 285—249 |
| 2,868,564 | 1/59 | Arras | 285—243 |
| 2,926,029 | 2/60 | St. Clair | 285—256 |

FOREIGN PATENTS

| | | |
|---|---|---|
| 328,787 | 5/30 | Great Britain. |
| 334,935 | 9/50 | Great Britain. |

CARL W. TOMLIN, *Primary Examiner.*

EDWARD C. ALLEN, *Examiner.*